United States Patent
Cope et al.

(10) Patent No.: US 8,649,770 B1
(45) Date of Patent: Feb. 11, 2014

(54) EXTENDED TRUSTED SECURITY ZONE RADIO MODEM

(75) Inventors: Warren B. Cope, Olathe, KS (US); Lyle W. Paczkowski, Mission Hills, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

(21) Appl. No.: 13/540,437

(22) Filed: Jul. 2, 2012

(51) Int. Cl.
*H04M 1/66* (2006.01)

(52) U.S. Cl.
USPC ........ 455/411; 455/550.1; 455/557; 370/217; 370/231; 713/159; 713/182

(58) Field of Classification Search
None
See application file for complete search history.

(56) References Cited

U.S. PATENT DOCUMENTS

| | | | |
|---|---|---|---|
| 5,303,378 A * | 4/1994 | Cohen ........................... | 710/264 |
| 6,668,322 B1 | 12/2003 | Wood et al. | |
| 6,824,064 B2 * | 11/2004 | Guthery et al. ............... | 235/492 |
| 6,895,234 B1 | 5/2005 | Laursen et al. | |
| 7,650,645 B1 | 1/2010 | Langendorf et al. | |
| 8,238,823 B2 | 8/2012 | Maugars et al. | |
| 8,494,576 B1 | 7/2013 | Bye et al. | |
| 8,504,097 B1 | 8/2013 | Cope et al. | |
| 2002/0194496 A1 | 12/2002 | Griffin et al. | |
| 2004/0243810 A1 | 12/2004 | Ringborg et al. | |
| 2005/0015601 A1 * | 1/2005 | Tabi .............................. | 713/182 |
| 2005/0235166 A1 * | 10/2005 | England et al. ............... | 713/193 |
| 2006/0036851 A1 * | 2/2006 | DeTreville .................... | 713/159 |
| 2006/0212853 A1 | 9/2006 | Sutardja | |
| 2006/0224901 A1 | 10/2006 | Lowe | |
| 2006/0261949 A1 | 11/2006 | Kim et al. | |
| 2006/0277433 A1 | 12/2006 | Largman et al. | |
| 2007/0061535 A1 | 3/2007 | Xu et al. | |
| 2007/0079120 A1 | 4/2007 | Bade et al. | |
| 2007/0177771 A1 | 8/2007 | Tanaka et al. | |
| 2007/0186212 A1 | 8/2007 | Mazzaferri et al. | |
| 2007/0197261 A1 | 8/2007 | Humbel | |
| 2007/0214332 A1 | 9/2007 | Sonoda et al. | |
| 2007/0277223 A1 * | 11/2007 | Datta et al. ................... | 726/2 |
| 2008/0014867 A1 | 1/2008 | Finn | |
| 2008/0022374 A1 | 1/2008 | Brown et al. | |
| 2008/0162361 A1 | 7/2008 | Sklovsky | |
| 2008/0176538 A1 | 7/2008 | Terrill et al. | |
| 2008/0188178 A1 | 8/2008 | Maugars et al. | |
| 2008/0201212 A1 | 8/2008 | Hammad et al. | |

(Continued)

FOREIGN PATENT DOCUMENTS

WO 2013170228 A2 11/2013

OTHER PUBLICATIONS

FAIPP Pre-Interview Communication dated Oct. 24, 2012, U.S. Appl. No. 13/463,797, filed May 3, 2012.

(Continued)

*Primary Examiner* — Rafael Pérez-Gutiérrez
*Assistant Examiner* — Keith Fang

(57) ABSTRACT

A cellular wireless modem. The cellular wireless modem comprises a cellular radio transceiver, a short range communication interface, a processor, wherein the processor comprises a trusted security zone, a memory, wherein the memory stores an input forwarding application, and a trusted security zone extension application stored in the memory. When executed by the processor, the extension application provisions the input forwarding application to an intelligent appliance via the short range communication interface, receives input from the input forwarding application executing on the intelligent appliance via the short range communication interface, and transmits a message based on the input via the cellular radio transceiver.

20 Claims, 5 Drawing Sheets

(56) References Cited

U.S. PATENT DOCUMENTS

| | | | |
|---|---|---|---|
| 2009/0055278 | A1 | 2/2009 | Nemani |
| 2009/0113425 | A1* | 4/2009 | Ports et al. .......... 718/1 |
| 2009/0281947 | A1 | 11/2009 | Erel |
| 2009/0320028 | A1 | 12/2009 | Gellerich et al. |
| 2010/0031325 | A1 | 2/2010 | Maigne et al. |
| 2010/0052844 | A1 | 3/2010 | Wesby |
| 2010/0128598 | A1* | 5/2010 | Gandhewar et al. .......... 370/217 |
| 2010/0142517 | A1 | 6/2010 | Montemurro et al. |
| 2010/0162028 | A1 | 6/2010 | Frank et al. |
| 2010/0223348 | A1 | 9/2010 | Przybysz et al. |
| 2010/0274726 | A1 | 10/2010 | Florek et al. |
| 2011/0014948 | A1 | 1/2011 | Yeh |
| 2011/0021175 | A1 | 1/2011 | Florek et al. |
| 2011/0035604 | A1 | 2/2011 | Habraken |
| 2011/0078081 | A1 | 3/2011 | Pirzadeh et al. |
| 2011/0212707 | A1 | 9/2011 | Mahalal |
| 2011/0226853 | A1 | 9/2011 | Soh et al. |
| 2011/0237190 | A1 | 9/2011 | Jolivet |
| 2011/0281558 | A1 | 11/2011 | Winter |
| 2011/0294418 | A1 | 12/2011 | Chen |
| 2012/0011572 | A1 | 1/2012 | Chew et al. |
| 2012/0021683 | A1 | 1/2012 | Ma et al. |
| 2012/0028575 | A1 | 2/2012 | Chen et al. |
| 2012/0052801 | A1 | 3/2012 | Kulkarni |
| 2012/0084211 | A1* | 4/2012 | Petrov et al. .......... 705/64 |
| 2012/0143703 | A1 | 6/2012 | Wall et al. |
| 2012/0149327 | A1 | 6/2012 | Raboisson et al. |
| 2012/0158467 | A1 | 6/2012 | Hammad et al. |
| 2012/0159163 | A1 | 6/2012 | von Behren et al. |
| 2012/0159612 | A1 | 6/2012 | Reisgies |
| 2012/0178365 | A1 | 7/2012 | Katz et al. |
| 2012/0178366 | A1 | 7/2012 | Levy et al. |
| 2012/0190332 | A1 | 7/2012 | Charles |
| 2012/0202423 | A1 | 8/2012 | Tiedemann et al. |
| 2012/0238206 | A1 | 9/2012 | Singh et al. |
| 2012/0252480 | A1 | 10/2012 | Krutt et al. |
| 2012/0258690 | A1 | 10/2012 | Chen et al. |
| 2012/0266220 | A1 | 10/2012 | Brudnicki et al. |
| 2012/0295588 | A1 | 11/2012 | Chen et al. |
| 2012/0297187 | A1 | 11/2012 | Paya et al. |
| 2013/0054474 | A1 | 2/2013 | Yeager |
| 2013/0062417 | A1 | 3/2013 | Lee et al. |
| 2013/0109307 | A1 | 5/2013 | Reisgies et al. |
| 2013/0117186 | A1 | 5/2013 | Weinstein et al. |
| 2013/0138521 | A1 | 5/2013 | Want et al. |
| 2013/0138959 | A1 | 5/2013 | Pelly et al. |
| 2013/0140360 | A1 | 6/2013 | Graylin |
| 2013/0143489 | A1 | 6/2013 | Morris et al. |
| 2013/0174147 | A1* | 7/2013 | Sahita et al. .......... 718/1 |
| 2013/0305333 | A1 | 11/2013 | Katzer et al. |

OTHER PUBLICATIONS

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

FAIPP Pre-Interview Communication dated Jun. 6, 2013, U.S. Appl. No. 13/571,348, filed Aug. 10, 2012.

FAIPP Pre-Interview Communication dated Jun. 5, 2013, U.S. Appl. No. 13/556,200, filed Jul. 24, 2012.

First Action Interview Office Action dated Aug. 19, 2013, U.S. Appl. No. 13/556,200, filed Jul. 24, 2012.

First Action Interview Pre-Interview Communication dated Dec. 27, 2011, U.S. Appl. No. 12/486,873, filed Jun. 18, 2009.

First Action Interview Office Action dated Feb. 13, 2012, U.S. Appl. No. 12/486,873, filed Jun. 18, 2009.

Office Action dated Jul. 5, 2012, U.S. Appl. No. 12/486,873, filed Jun. 18, 2009.

Final Office Action dated Feb. 1, 2013, U.S. Appl. No. 12/486,873, filed Jun. 18, 2009.

Cope, Warren B., et al., "Electronic Purchase Transaction Trust Infrastructure", filed May 29, 2012, U.S. Appl. No. 13/482,731.

Cope, Warren B., et al., "Alternative hardware and Software Configuration for Near Field Communication", filed May 4, 2012, U.S. Appl. No. 13/463,797.

Cope, Warren B., et al., "Multiple Secure Elements in Mobile Electronic Device with Near Field Communication Capability", filed Apr. 5, 2012, U.S. Appl. No. 13/440,980.

Bye, Stephen James, et al., "Near Field Communication Authentication and Validation to Access Corporate Data", filed May 3, 2012, U.S. Appl. No. 13/463,801.

Katzer, Robin D., et al., "Web Server Bypass of Backend Process on Near Field Communications and Secure Elements Chips", filed May 11, 2012, U.S. Appl. No. 13/470,203.

Katzer, Robin D., et al., "Web Server Bypass of Backend Process on Near Field Communications and Secure Elements Chips", filed May 10, 2013, PCT Application No. PCT/US13/40673.

Katzer, Robin D., et al., "Secure Placement of Centralized Media Controller Application in Mobile Access Terminal", filed Nov. 11, 2011, U.S. Appl. No. 13/294,177.

McRoberts, Leo Michael, et al., "End-to-End Trusted Communications Infrastructure", filed Jun. 25, 2012, U.S. Appl. No. 13/532,588.

McRoberts, Leo Michael, et al., "End-to-End Trusted Communications Infrastructure", filed Jun. 25, 2013, PCT Serial No. PCT/US13/47729.

Paczkowski, Lyle W., et al., "Trusted Policy and Charging Enforcement Function", filed Jun. 27, 2012, U.S. Appl. No. 13/533,969.

Bye, Stephen James, et al., "Systems and Methods for Provisioning and Using Multiple Trusted Security Zones on an Electronic Device", filed Aug. 10, 2012, U.S. Appl. No. 13/571,348.

Bye, Stephen James, et al., "Systems and Methods for Provisioning and Using Multiple Trusted Security Zones on an Electronic Device", filed on Aug. 5, 2013, PCT Serial No. PCT/US13/53617.

Bye, Stephen James, et al., "Trusted Signaling in Long Term Evolution (LTE) 4G Wireless Communication", filed Feb. 7, 2013, U.S. Appl. No. 13/762,319.

Katzer, Robin D., et al., "Trusted Access to Third Party Applications Systems and Methods", filed Jul. 25, 2012, U.S. Appl. No. 13/557,213.

Paczkowski, Lyle W., et al., "System and Methods for Trusted Internet Domain Networking", filed Sep. 11, 2012, U.S. Appl. No. 13/610,856.

Paczkowski, Lyle W., et al., "Trusted Security Zone Access to Peripheral Devices", filed Jul. 24, 2012, U.S. Appl. No. 13/556,200.

Paczkowski, Lyle W., et al., "Trusted Security Zone Access to Peripheral Devices", filed Jul. 24, 2013, PCT Application No. PCT/US13/51750.

Paczkowski, Lyle W., et al., Enablement of a Trusted Security Zone Authentication for Remote Mobile Device Management Systems and Methods, filed Mar. 15, 2013, U.S. Appl. No. 13/844,357.

Paczkowski, Lyle W., et al., "Trusted Security Zone Communication Addressing on an Electronic Device", filed Mar. 15, 2013, U.S. Appl. No. 13/844,145.

Bye, Stephen James, et al., "Protection for Multimedia Files Pre-Downloaded to a Mobile Device", filed Apr. 15, 2013, U.S. Appl. No. 13/863,376.

Paczkowski, Lyle W., et al., "Point-of-Sale and Automated Teller Machine Transactions Using Trusted Mobile Access Device", filed Mar. 13, 2013, U.S. Appl. No. 13/802,383.

Paczkowski, Lyle W., et al., "Trusted Security Zone Re-Provisioning and Re-Use Capability for Refurbished Mobile Devices", filed Mar. 14, 2013, U.S. Appl. No. 13/831,486.

Paczkowski, Lyle W., et al., "Trusted Security Zone Enhanced with Trusted Hardware Drivers", filed Mar. 13, 2013, U.S. Appl. No. 13/802,404.

Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.

(56) References Cited

OTHER PUBLICATIONS

Paczkowski, Lyle W., et al., "JTAG Fuse Vulnerability Determination and Protection Using a Trusted Execution Environment", filed Mar. 15, 2013, U.S. Appl. No. 13/844,325.

Paczkowski, Lyle W., et al., "Trusted Security Zone Containers for the Protection and Confidentiality of Trusted Service Manager Data", filed Mar. 14, 2013, U.S. Appl. No. 13/831,463.

Bye, Stephen James, et al., "Delivering Digital Content to a Mobile Device via a Digital Rights Clearing House", filed Apr. 10, 2013, U.S. Appl. No. 13/860,338.

Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.

Paczkowski, Lyle W., et al., "Verifying Applications Using a Trusted Security Zone", filed Aug. 12, 2013, U.S. Appl. No. 13/964,112.

Paczkowski, Lyle W., et al., "Mobile Access Terminal with Local Call Session Control Function", filed Jun. 18, 2009, U.S. Appl. No. 12/486,873.

Zimmerman, Ann, "Check Out the Future of Shopping", The Wall Street Journal, Business, May 18, 2011, http://online.wsj.com/article/SB10001424052748703421204576329253050634700.html.

Garry, Michael, Kroger Test Prepares for Mobile Future:, SN, Supermarket News, Jun. 13, 2011, http://supermarketnews.com/technology/kroger-test-prepares-mobile-future.

Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.

Final Office Action dated Sep. 9, 2013, U.S. Appl. No. 13/440,980, filed Apr. 5, 2012.

Office Action dated Sep. 25, 2013, U.S. Appl. No. 13/571,348, filed Aug. 10, 2012.

Restriction Requirement dated Nov. 1, 2013, U.S. Appl. No. 13/557,213, filed Jul. 25, 2012.

Notice of Allowance dated Oct. 16, 2013, U.S. Appl. No. 13/556,200, filed Jul. 24, 2012.

\* cited by examiner

US 8,649,770 B1

EXTENDED TRUSTED SECURITY ZONE RADIO MODEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A variety of confidential communications transactions are completed over networks that may be subject to a variety of security threats. For example, confidential financial information such as credit card account number and authentication codes may be transmitted via a network to an on-line retail store. Personal health information such as measured health parameters may be transmitted via a network to a medical monitoring service. Security threats may include infiltrating malware onto a computing device such as a desktop computer, a laptop computer, or other device. The malware may obtain confidential information in various ways and send this out in communications that may be hidden from a normal user to a nefarious computer or application via the network. The malware may screen scrape information by accessing the outputs to a display screen. The malware may capture keyboard input.

SUMMARY

In an embodiment, a method of wireless communication is disclosed. The method comprises coupling a cellular wireless modem to an intelligent appliance, wherein the intelligent appliance has a processor and a user interface input device, transmitting a trusted security zone extension application from the cellular wireless modem to the intelligent appliance, executing the trusted security zone extension application at a ring 0 level of the processor of the intelligent appliance, and blocking access to the user interface input device by an application executing above the ring 0 level of the processor of the intelligent application, wherein the blocking access is performed by the trusted security zone extension application. The method further comprises transmitting an input received by the user interface input device to the cellular wireless modem, wherein the transmitting the input is performed by the trusted security zone extension application and transmitting a cellular wireless message by the cellular wireless modem, where the message is based on the input received by the user interface input device.

In an embodiment, a method of wireless communication is disclosed. The method comprises coupling a cellular wireless modem to an intelligent appliance, wherein the intelligent appliance has a processor and a user interface input device, provisioning a trusted security zone extension application on the intelligent appliance, and executing the trusted security zone extension application. The method further comprises executing a non-preemptable routine of the trusted security zone extension application, wherein the non-preemptable routine reads an input from the user interface input device and transmits the input to the cellular wireless modem and transmitting a cellular wireless message by the cellular wireless modem, wherein the message is based on the input from the user interface input device.

In an embodiment, a cellular wireless modem is disclosed. The cellular wireless modem comprises a cellular radio transceiver, a short range communication interface, a processor, wherein the processor comprises a trusted security zone, a memory, wherein the memory stores an input forwarding application, and a trusted security zone extension application stored in the memory. When executed by the processor, the extension application provisions the input forwarding application to an intelligent appliance via the short range communication interface, receives input from the input forwarding application executing on the intelligent appliance via the short range communication interface, and transmits a message based on the input via the cellular radio transceiver.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
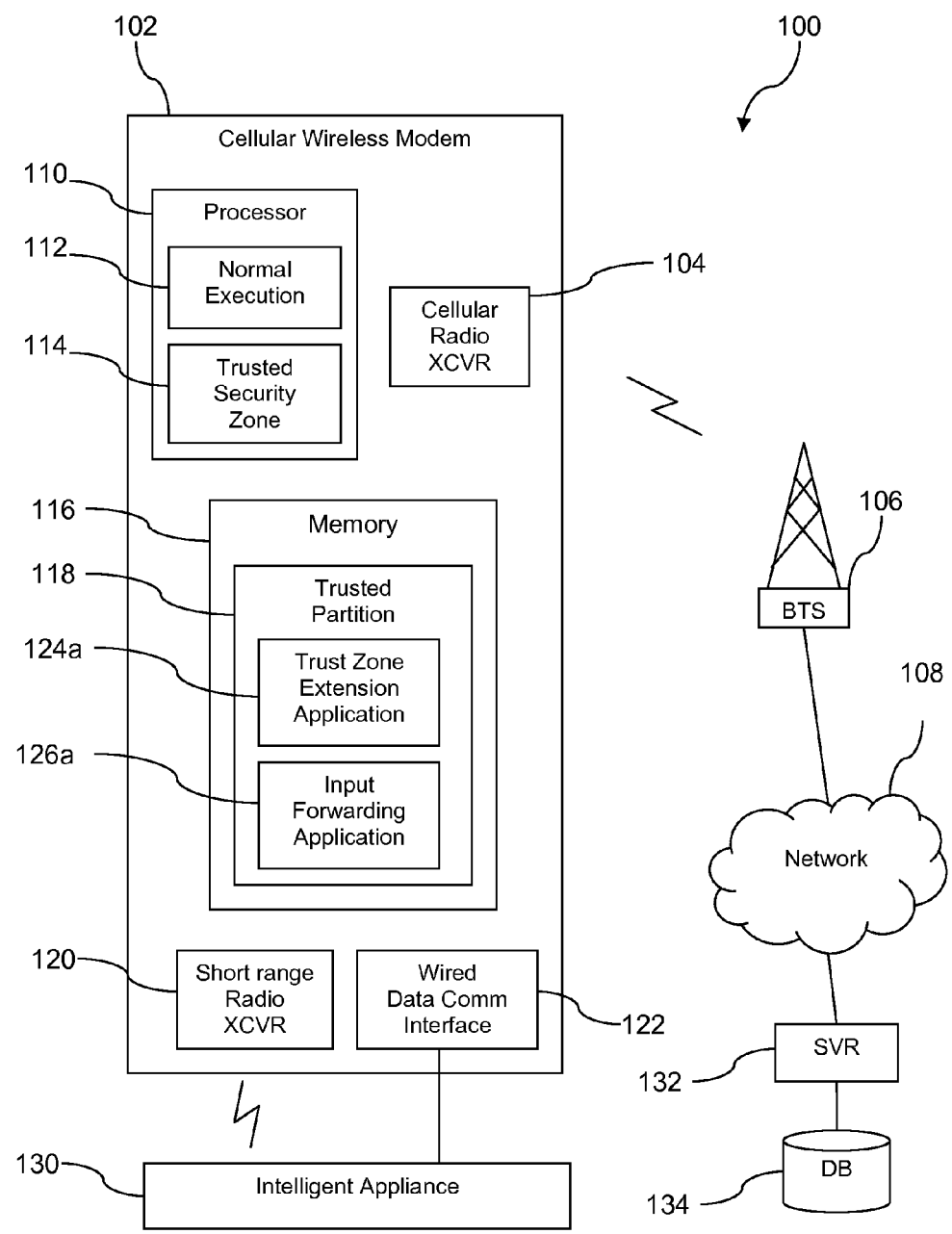
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system and method are taught that promote extending a trusted communication path to an otherwise untrusted computer in a confirmable manner. A computer or intelligent device may not implement a trusted security zone and hence may be considered an untrusted device. For example, the computer may have been infiltrated by viruses, spyware, Trojans, or other malware that could propagate across a communication link coupled to the computer. In an embodiment, a radio modem having a trusted security zone is communicatively coupled to the computer, installs a trusted security zone extension application on the computer, and engages as a mediator or bridge for trusted communication between the computer and another trusted network node. In an embodiment, the trusted security zone extension application may block access to the input and output devices of the computer by other applications executing on the computer and/or a processor of the computer (e.g., one or more of a plurality of processors of a multiprocessor computer, for example processors that do not execute the subject trusted security zone extension application). The trusted security zone extension application may receive inputs, for example keyboard inputs, input to the computer and forward this input to the trusted security zone on the radio modem. The trusted security zone on the radio modem sends the input on to the trusted network node.

In an embodiment, the trusted security zone extension application may execute in a ring 0 level of the computer system, for example at the most privileged level of the computer. Alternatively, in another embodiment, the trusted security zone extension application may execute as a non-preemptible routine where the trusted security zone extension application holds the processor and/or processors of the computer until an input session has been completed and then releases the processor and/or processors. In either embodiment, the trusted security zone extension application may uninstall itself or delete itself after completion of a delimited procedure, such as a web session.

The system and method described above may promote using computers that have not been configured during manufacturing to have a trusted security zone, thereby enabling the extension of communication trust to what otherwise would be an untrusted computer. In an embodiment, the trusted security zone extension application may be said to couple to the hardware and/or the chipset of the subject computer, but does not actually execute in a trusted security zone of the computer (because this solution and disclosure presumes the computer does not feature a trusted security zone). The trusted security zone extension application may be executed under supervision of and/or control of a trusted application executing in the trusted security zone of the radio modem. In this way, it may be said that the trusted security zone extension application taught herein leverages the trusted security zone of the radio modem to provide security like that of a trusted security zone for communication operations of the computer that engage the radio modem.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete Trusted Execution Environment (TEE) may be implemented through the use of the trusted security zone hardware and software architecture. The Trusted Execution Environment is an execution environment that is parallel to the execution environment of the main mobile device operating system. The Trusted Execution Environment and/or the trusted security zone may provide a base layer of functionality and/or utilities for use of applications that may execute in the trusted security zone. For example, in an embodiment, trust tokens may be generated by the base layer of functionality and/or utilities of the Trusted Execution Environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution Environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 100 is described. In an embodiment, the system 100 comprises a cellular wireless modem 102 having a cellular radio transceiver 104, a base transceiver station (BTS) 106, a network 108, and a server computer 132. In an embodiment, the server 132 is coupled to a data store 134. While shown as directly connected to the data store 134, in an embodiment the server 132 may communicate with the data store via the network 108. In an embodiment, the network 108 comprises one or more public networks, one or more private networks, or a combination thereof. In some contexts, the cellular wireless modem 102 may be referred to as a radio modem.

The cellular wireless modem 102 may comprise a processor 110 that promotes a normal execution zone 112 and a trusted security zone 114. In an embodiment, the normal execution zone 112 may be implemented by a processor that is a separate processor than a processor that implements the trusted security zone 114. In another embodiment, the normal execution zone 112 executes on a first virtual processor and the trusted security zone 114 executes on a second virtual processor.

The cellular wireless modem 102 further comprises a memory 116 having a trusted partition 118. The trusted partition 118 may store a trust zone extension application 124a and an input forwarding application 126a. The cellular wireless modem 102 may comprise one or more of a short range radio transceiver 120 or a wired data communication interface 122. The short range radio transceiver 120 may be a WiFi radio transceiver, a Bluetooth® radio transceiver, or some other kind of radio transceiver. The wired data communication interface 122 may be a universal serial bus (USB) interface or some other kind of wired interface.

The cellular wireless modem 102 may be in communication with an intelligent appliance 130 and may provide a communication link from the intelligent appliance 130 via one of the short range radio transceiver 120 or the wired data communication interface 122 and via a cellular wireless link from the cellular radio transceiver 104 to the base transceiver station 106. Using the cellular wireless modem 102, the intelligent appliance 130 may establish a communication link to the network 108, for example to the server 132 to request content and/or to complete an on-line purchase transaction. The intelligent appliance 130 may comprise a desktop computer, a laptop computer, a printer, a medical monitoring device, or a variety of other devices that may embed a computer or processor. By communicatively coupling the cellular wireless modem 102 to the intelligent appliance 130, a trusted communication path may be extended to and provided to the intelligent appliance 130, as described further herein below. While not described in detail, the cellular wireless modem 102 may also provide a normal or untrusted communication path from the intelligent appliance 130 to the network 108, for example when an untrusted application executing on the intelligent appliance 130 may access the network 108, for example to cruise the Internet.

In an embodiment, when the cellular wireless modem 102 is communicatively coupled to the intelligent appliance 130, the trust zone extension application 124a may execute in the trusted partition 118. The trust zone extension application 124a may be said to execute in a trusted security zone. The trust zone extension application 124a may provision and/or copy one or more applications to the intelligent appliance 130 to promote an enhanced level of secure operation of the intelligent appliance 130.

Figure 2:
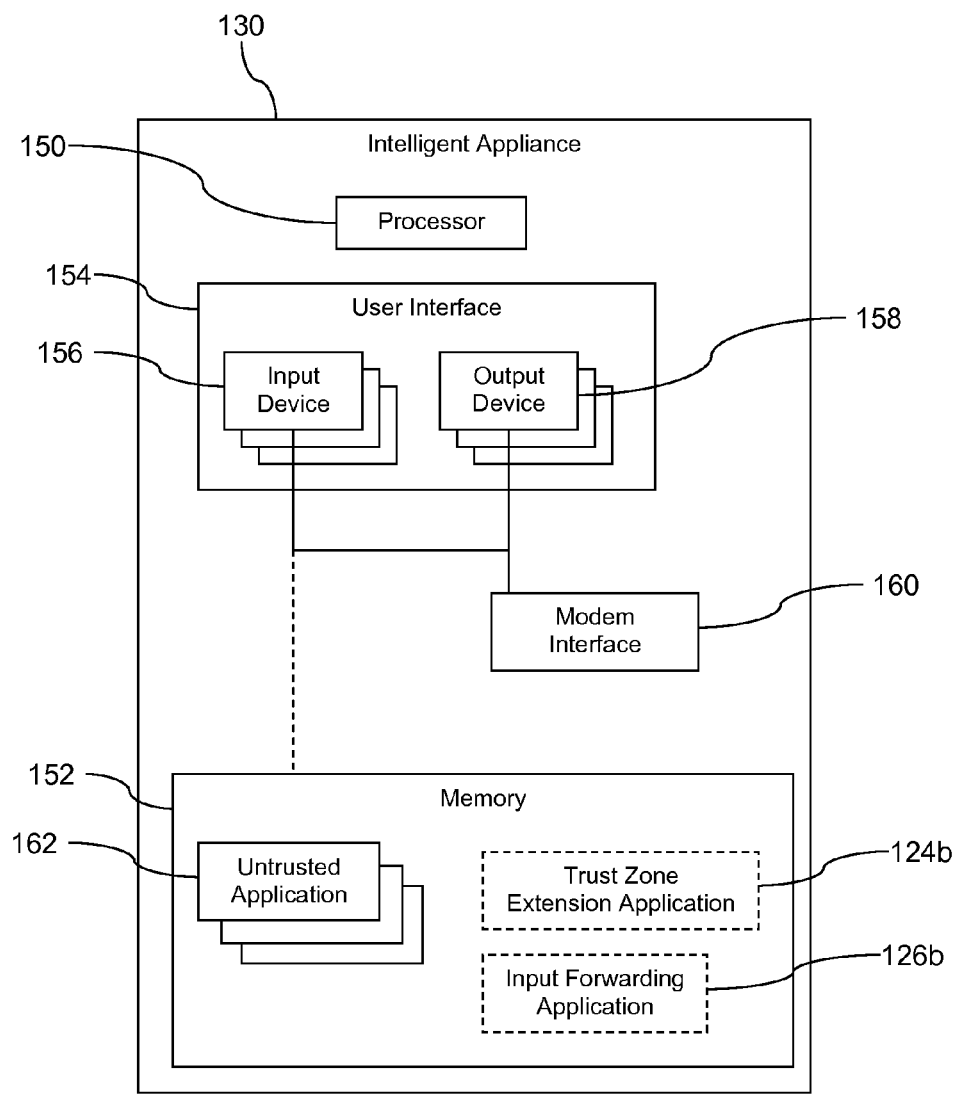
FIG. 2 is an illustration of an intelligent appliance according to an embodiment of the disclosure.

Turning now to FIG. 2, further details of an embodiment of the intelligent appliance 130 are described. In an embodiment, the intelligent appliance 130 comprises a processor 150, a memory 152, a user interface 154 having one or more input devices 156 and one or more output devices 158. The intelligent appliance 130 further comprises a modem interface 160. The memory 152 may store one or more untrusted applications 162.

When the intelligent appliance 130 is communicatively coupled to the cellular wireless modem 102 via the modem interface 160, the trust zone extension application 124a may provision a trust zone extension application 124b and/or an input forwarding application 126b into the memory 152 of the intelligent appliance 130. For example, the cellular wireless modem 102 may transfer the trust zone extension application 124b and the input forwarding application 126b to the intelligent appliance 130 and store this copy in the memory 152 of the intelligent appliance 130. The trust zone extension application 124b may act as an agent on the intelligent appliance 130 of the trust zone extension application 124a, performing actions on the intelligent appliance 130 that are invoked by the trust zone extension application 124a executing on the cellular wireless modem 102. The trust zone extension application 124b input forwarding application 126b may be executed by the processor 150 when invoking a communication link via the cellular wireless modem 102 to the network 108. When it is executed, the trust zone extension application 124b may prevent the untrusted applications 162 from executing while the communication link via the cellular wireless modem 102 to the network 108 is established, thereby preventing the untrusted applications 162 from spying on inputs to the input devices 156. When commanded by the trust zone extension application 124a executing on the cellular wireless modem 102, the trust zone extension application 124b may execute the input forwarding application 126b. The input forwarding application 126b may capture inputs provided by a user to the input device 156 and send them to the input forwarding application 126a executing on the cellular wireless modem 102. The input forwarding application 126a may then send these to the cellular radio transceiver 104 for transmitting to the base transceiver station 106, the network 108, and possibly to the server 132, for example to complete an on-line purchase transaction or some other transmission of confidential information.

The trust zone extension application 124b may execute at the ring 0 level of the processor 150 or alternatively may execute as an unpreemptable application on the processor 150. In an embodiment, the trust zone extension application 124b may cause an indicator to be presented on a display of the intelligent appliance 130 that indicates that a trusted security zone communication link is established and is communicating. The trust zone extension application 124b may uninstall the input forwarding application 126b and then uninstall itself in response to receiving a command to do so from the trust zone extension application 124a executing on the cellular wireless modem 102. Uninstalling the trust zone extension application 124a and the input forwarding application 126b may reduce the opportunity for any of the untrusted applications 162 altering or corrupting the trust zone extension application 124b or the input forwarding application 126b. In an embodiment, the trust zone extension application 124b and the input forwarding application 126b may be combined in a single component. Alternatively, one or more of the trust zone extension application 124b or input forwarding application 126b may be provided as two or more components or applications.

Figure 3:
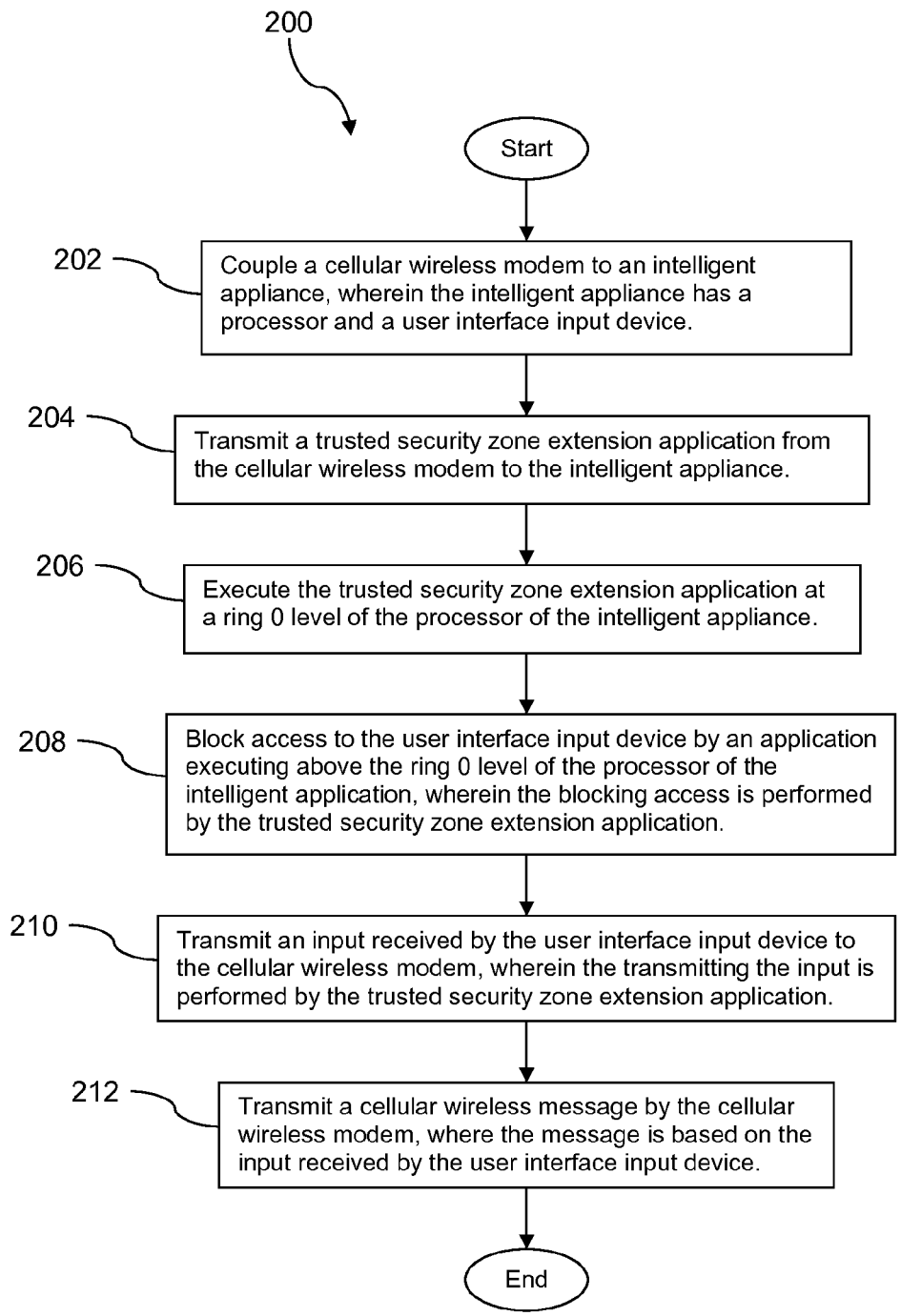
FIG. 3 is a flow chart of a method according to an embodiment of the disclosure.

Turning now to FIG. 3, a method 200 is described. At block 202, a cellular wireless modem 102 is coupled to an intelligent appliance 130, wherein the intelligent appliance 130 has a processor 150 and a user interface input device 156. At block 204, a trusted security zone extension application (for example, the trust zone extension application 124b and/or the input forwarding application 126b) is transmitted from the cellular wireless modem 102 to the intelligent appliance 130. At block 206, a trusted security zone extension application (for example, the trust zone extension application 124b and/ or the input forwarding application 126b) is executed at a ring 0 level of the processor 150 of the intelligent appliance 130. At block 208, access to the user interface input device 156 is blocked by an application (for example, the trust zone extension application 124b) executing at the ring 0 level of the processor 150 of the intelligent appliance 130, wherein blocking access is performed by the trusted security zone extension application. At block 210, an input received by the user interface input device 156 is transmitted to the cellular wireless modem 102, wherein transmitting the input is performed by the trusted security zone extension application. At block 212, a cellular wireless message is transmitted by the cellular wireless modem 102, where the message is based on the input received by the user interface input device 156.

Figure 4:
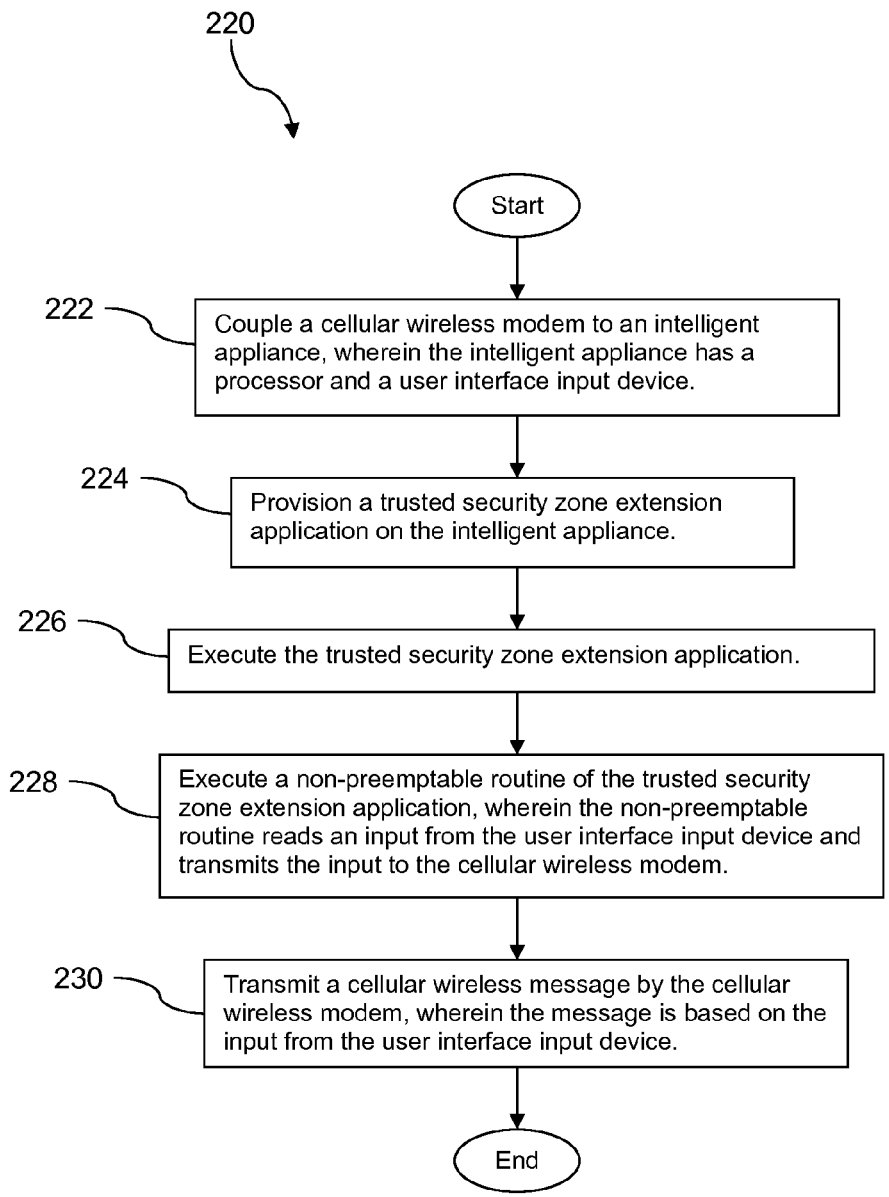
FIG. 4 is a flow chart of another method according to an embodiment of the disclosure.

Turning now to FIG. 4, a method 220 is described. At block 222, a cellular wireless modem 102 is coupled to an intelligent appliance 130, wherein the intelligent appliance 130 has a processor 150 and a user interface input device 156. At block 224, a trusted security zone extension application (for example, the trust zone extension application 124b and/or the input forwarding application 126b) is provisioned on the intelligent appliance 130. At block 226, the trusted security zone extension application is executed. At block 228, a non-preemptable routine of the trusted security zone extension application executes, wherein the non-preemptable routine reads an input from the user interface input device 156 and transmits the input to the cellular wireless modem 102. At block 230, a cellular wireless message is transmitted by the cellular wireless modem 102, wherein the message is based on the input from the user interface input device 156.

Figure 5:
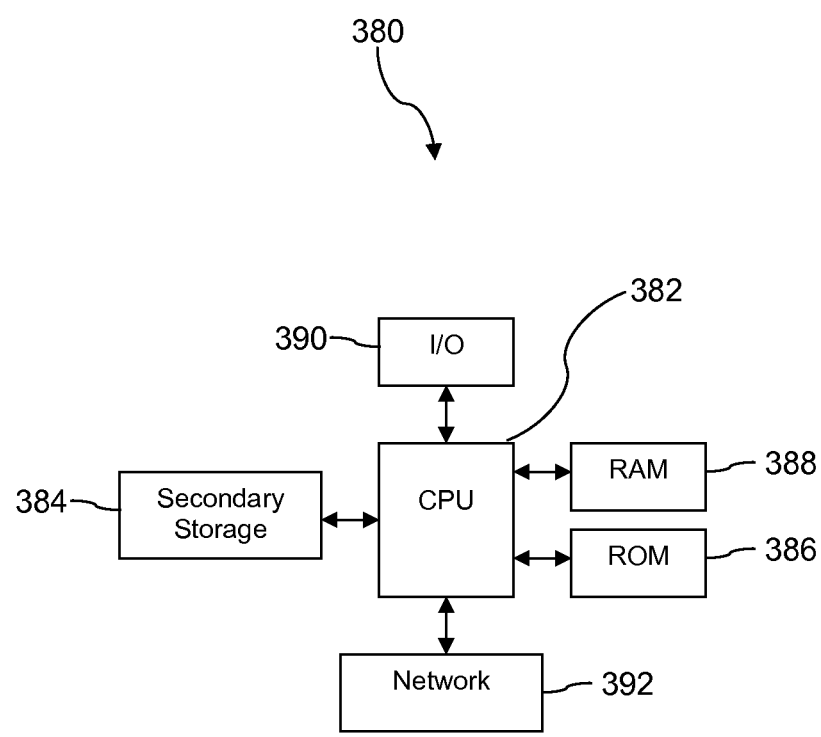
FIG. 5 is an illustration of a computer system according to an embodiment of the disclosure.

FIG. 5 illustrates a computer system 380 suitable for implementing one or more embodiments disclosed herein. For example, the cellular wireless modem 102, the intelligent appliance 130, and the server 132 may be implemented, at least in part, in a form similar to the system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of wireless communication, comprising:
    coupling a cellular wireless modem to an intelligent appliance, wherein the intelligent appliance has a processor and a user interface input device;
    transmitting a trusted security zone extension application from the cellular wireless modem to the intelligent appliance;
    executing the trusted security zone extension application at a ring 0 level of the processor of the intelligent appliance;
    blocking access to the user interface input device by an application executing above the ring 0 level of the processor of the intelligent application, wherein the blocking access is performed by the trusted security zone extension application;
    transmitting an input received by the user interface input device to the cellular wireless modem, wherein the transmitting the input is performed by the trusted security zone extension application; and
    transmitting a cellular wireless message by the cellular wireless modem, where the message is based on the input received by the user interface input device.

2. The method of claim 1, wherein the cellular wireless message is communicated via one of a code division multiple access (CDMA), a global system for mobile communications (GSM), a worldwide interoperability for microwave access (WiMAX), or a long term evolution (LTE) wireless communication protocol.

3. The method of claim 1, wherein coupling the cellular wireless modem to the intelligent appliance comprises establishing a WiFi wireless link between the cellular wireless modem and the intelligent appliance.

4. The method of claim 1, wherein coupling the cellular wireless modem to the intelligent appliance comprises establishing a wired link between the cellular wireless modem and the intelligent appliance.

5. The method of claim 1, wherein the cellular wireless modem comprises a trusted security zone, and wherein transmitting the trusted security zone extension application to the intelligent appliance and transmitting the cellular wireless message is performed by the trusted security zone of the cellular wireless modem.

6. The method of claim 1, wherein the intelligent appliance is one of a laptop computer, a notebook computer, a tablet computer, a desktop computer, a printer, or a refrigerator.

7. A method of wireless communication, comprising:
    coupling a cellular wireless modem to an intelligent appliance, wherein the intelligent appliance has a processor and a user interface input device;
    provisioning a trusted security zone extension application on the intelligent appliance;
    executing the trusted security zone extension application at a ring 0 level of the processor of the intelligent appliance;
    blocking access to the user interface input device by an application executing above the ring 0 level of the processor of the intelligent application, wherein the blocking access is performed by the trusted security zone extension application; and
    transmitting a cellular wireless message by the cellular wireless modem, wherein the message is based on input from the user interface input device.

8. The method of claim 7, further comprising de-provisioning the trusted security zone extension application from the intelligent appliance.

9. The method of claim 7, wherein the cellular wireless message comprises confidential information based on the input from the user interface input device.

10. The method of claim 9, wherein the cellular wireless message is transmitted to an on-line store.

11. The method of claim 7, wherein the cellular wireless modem comprises a trusted security zone.

12. The method of claim 7, wherein coupling the cellular wireless modem to the intelligent appliance comprises establishing a WiFi wireless link or a wired link between the cellular wireless modem and the intelligent appliance.

13. The method of claim 7, wherein the intelligent appliance is one of a laptop computer, a notebook computer, a tablet computer, a desktop computer, a printer, or a refrigerator.

14. A cellular wireless modem, comprising:
    a cellular radio transceiver;
    a short range communication interface;
    a processor, wherein the processor comprises a trusted security zone;
    a memory, wherein the memory stores an input forwarding application; and
    a trusted security zone extension application stored in the memory that, when executed by the processor,
        provisions the input forwarding application to an intelligent appliance via the short range communication interface,
        receives input from the input forwarding application executing at a ring 0 level of the processor on the intelligent appliance via the short range communication interface,
        blocks access to a user interface input device of the intelligent appliance by an application executing above the ring 0 level of the processor of the intelligent application, and
        transmits a message based on the input via the cellular radio transceiver.

15. The cellular wireless modem of claim 14, wherein the cellular radio transceiver communicates based on one of a code division multiple access (CDMA), a global system for mobile communications (GSM), a worldwide interoperability for microwave access (WiMAX), or a long term evolution (LTE) wireless communication protocol.

16. The cellular wireless modem of claim 14, wherein the short range communication interface is one of a WiFi radio transceiver, a Bluetooth transceiver, a wired serial communication interface, or a wired parallel communication interface.

17. The cellular wireless modem of claim 14, wherein the trusted security zone extension application is stored in a portion of the memory accessible only by the trusted security zone and wherein the trusted security zone extension application is executed only by the trusted security zone.

18. The cellular wireless modem of claim 14, wherein the message transmitted by the trusted security zone extension application comprises confidential information.

19. The cellular wireless modem of claim 18, wherein the confidential information comprises payment account information.

20. The cellular wireless modem of claim 18, wherein the confidential information comprises individual health information.

* * * * *